Oct. 3, 1933.   R. F. SCHUCHARDT ET AL   1,928,705
ELECTRIC SIGN
Filed Dec. 21, 1931
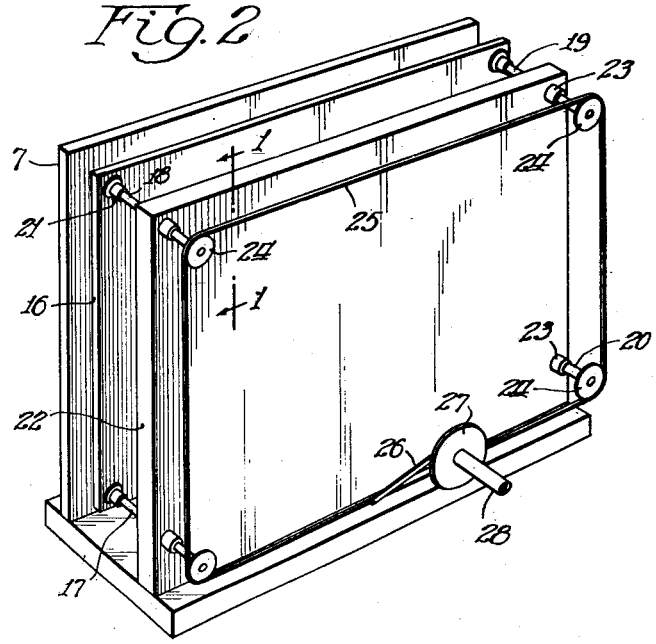
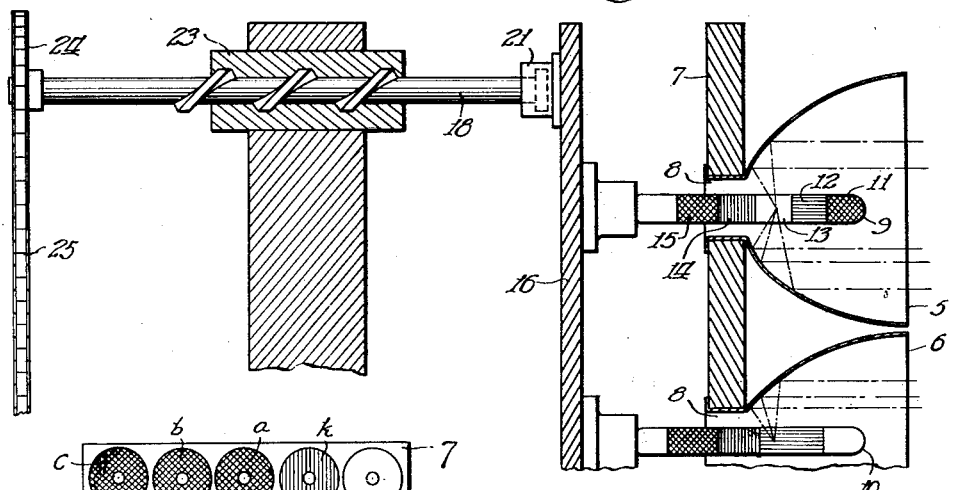
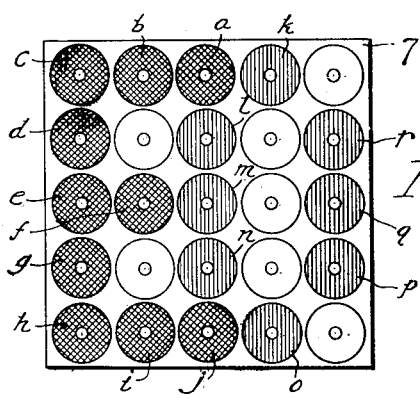
Inventors
Rudolph F. Schuchardt
Edwin D. Tillson Patented Oct. 3, 1933

1,928,705

UNITED STATES PATENT OFFICE 1,928,705

ELECTRIC SIGN

Rudolph F. Schuchardt and Edwin D. Tillson, Chicago, Ill., assignors to Associated Engineers Company, Chicago, Ill., a corporation of Illinois Application December 21, 1931
Serial No. 582,316

1 Claim. (Cl. 40—130)

Our invention relates to a changing letter sign signal or the like and has for its principal purpose the provision of a display device of this character which gives an animated sign or display without the necessity for the conventional flashing equipment usually necessary with signs of this type.

More particularly the invention concerns itself with the provision of light concentrating reflectors or lenses picking up light from sources located at their foci and sending out beams of light in rays together with means for changing the form of illumination at the focus of such reflectors or lenses so as to cause changes in the illumination sent out from the reflector or lens.

By different forms of illumination, we mean changes in degree of intensity as from complete darkness to the full brilliancy that can be obtained from a single light source and various color combinations that can be obtained by having a source of colored light at the focal point of the reflector or lens.

One form of the invention will be described by reference to the accompanying drawing wherein—

Fig. 1 is a vertical section through a portion of a sign embodying the invention;

Fig. 2 is a perspective view of the back of the sign; and

Fig. 3 is a front view illustrating different combinations that may be obtained with this device.

Referring now in detail to the drawing, in Fig. 1 we show a plurality of parabolic reflectors such as indicated at 5 and 6 which reflectors may be mounted upon a frame 7 and each of which is provided with a central rear opening such as indicated at 8. It is well known that a parabolic reflector picking up light located at its focal point sends out beams of light in parallel rays. Thus the appearance of a parabolic reflector is that of a full glow over the entire area of the reflector when presented to the eye of an observer viewing it from a head on position. We have shown only parabolic reflectors although it is clear that the same effect can be obtained by using other types of reflectors or lenses just so long as the light may be moved through the focal point of such reflectors or lenses to effect a change in the illumination from said reflector or lens.

Now if we take such a reflector and utilize for a light source an elongated tubular lamp having a line filament, such a lamp for example as is illustrated at 9 and 10 in Fig. 1, it is evident that different portions of this lamp will be at the focal point of the reflector as the lamp is moved backward and forward relative to the reflector.

Now if the lamp is divided into bands throughout its length and these bands made of different colors so as to give different forms of colors of illumination, the reflector will register the color of that band which happens to be in focus. As an example, we have shown an orange band at 11, a blue band at 12, a clear band at 13, a red band at 14, and an orange band at 15 on the lamp 9; while on the lamp 10 the extreme tip is clear, the next band is blue, the next band is red, and the next band is orange while the base is clear again. It is obvious, of course, that instead of having bands of color alternate bands of opaque paint and clear bands can be used so that as the lamp moves endwise into or out of the reflector it will alternately pass from full brilliance to darkness and again to full brilliance.

In order, therefore, to make up a display pattern on which various color combinations or lighting combinations can be obtained, it is necessary to provide some means for moving these lamps forward and backward within the reflectors.

We show a rear frame 16 holding the lamps, this rear frame being carried for example by the supports such as 17, 18, 19, and 20, swivelled therein as indicated at 21, and all mounted upon a supporting standard 22. The mounting of the supports such as 18 is shown as consisting of a screw-threaded mounting in a bearing member 23 so that upon rotation of the member 18 in one direction it will move through the member 23 to advance the frame 16 toward the frame 7, while upon rotation of the member 18 in the opposite direction frame 16 will be moved backward away from the frame 7.

This action of oscillation backward and forward of the frame 16 may, of course, be accomplished in any suitable manner, and a conventional means for so doing consists of the sprocket wheels 24 on the ends of the supports 17 to 20 together with a sprocket chain 25, a link 26, and a crank 27 driven by shaft 28. In order to accommodate for endwise movements of the various members 17, 18, 19, and 20, the sprocket chain 25 is capable of bending or flexing out of the plane of the wheels 24 where it connects with the link 26 a sufficient amount to permit the desired endwise movement of the shafts 17, 18, 19, and 20 without pulling the chain 25 off the sprocket wheels 24.

Any suitable source of power can be applied to the shaft 28, and it is believed to be evident that by rotating shaft 28 the chain 25 will be moved to and fro to cause the proper movement of the frame 16.

By the proper arrangement of the bands on the lamps, a great number of letter changes can be made, and, where the reflectors are used in banks, messages may be spelled out and the colors changed over a considerable range of combinations. The possible letter changes per cycle is limited by the length of the lamps 9 and 10. We have found that it is possible to make approximately eight changes with tubular lamps of this character which are available on the market.

Referring now to Fig. 3, we have illustrated for example how a very simple color scheme may be used. The reflecting units $a$ to $j$ may for instance come into alignment with an orange band at one particular position of the frame 16 and upon the next movement of the frame in either direction be blanked out while at the same time the units $k$ to $r$ will be brought from dark position to red because the lamps situated therein have moved from a position placing an opaque band at the focal point of their reflectors to a position placing a red band at the focal point. Any number of combinations can be worked out within the limits of the possible changes in degree or color of illumination per lamp.

As another application of this same principle, a fixed letter sign may be made wherein a letter goes through a cycle of color changes without at any time changing the message or darkening the sign or changing from one lamp to another.

The system may also be used in forming applique designs for use in connection with exterior color lighting treatments of buildings with the possibility of changing color as well as design.

From the above description, it is believed that the construction and operation of the device will be clear to those skilled in this art and the advantages thereof readily apparent. It is also believed to be obvious that the drawings and description are illustrative only and that many modifications and changes in design may be made without departing from the scope of the invention as herein set forth.

Having thus described one specific form of our invention, what we claim as new and desire to secure by Letters Patent is:

An illuminating device comprising a group of parabolic reflectors, an elongated lamp entering each of said reflectors from the back and movable through the focal point thereof, means for cyclically advancing and retracting said lamps in unison, said lamps being divided longitudinally into sections of different light radiation characteristics, the longitudinal positions of said sections being different on certain lamps than on others.

RUDOLPH F. SCHUCHARDT.
EDWIN D. TILLSON.